US010216116B2

(12) United States Patent
Sumida

(10) Patent No.: US 10,216,116 B2
(45) Date of Patent: Feb. 26, 2019

(54) OPTICAL SCANNING APPARATUS AND IMAGE FORMING APPARATUS INCLUDING THE SAME

(71) Applicant: CANON KABUSHIKI KAISHA, Tokyo (JP)

(72) Inventor: Noa Sumida, Narashino (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/910,533

(22) Filed: Mar. 2, 2018

(65) Prior Publication Data
US 2018/0259875 A1 Sep. 13, 2018

(30) Foreign Application Priority Data

Mar. 9, 2017 (JP) ................. 2017-045414

(51) Int. Cl.
G03G 15/043 (2006.01)
G03G 15/04 (2006.01)
G02B 26/12 (2006.01)
G03G 15/01 (2006.01)

(52) U.S. Cl.
CPC ....... *G03G 15/0435* (2013.01); *G02B 26/124* (2013.01); *G02B 26/125* (2013.01); *G03G 15/011* (2013.01); *G03G 15/04072* (2013.01); *G03G 2215/0404* (2013.01)

(58) Field of Classification Search
CPC ......... G03G 15/0435; G03G 15/04072; G03G 15/011; G03G 2215/0404; B41J 35/16; B41J 35/18; G02B 26/125; G02B 26/124
See application file for complete search history.

(56) References Cited

U.S. PATENT DOCUMENTS

2015/0185473 A1* 7/2015 Teramura ............. G03G 15/043
347/118
2015/0338647 A1* 11/2015 Ishihara ............... G03G 15/043
347/118
2016/0291500 A1* 10/2016 Taki .................... G03G 15/043

FOREIGN PATENT DOCUMENTS

JP 2006-154748 A 6/2006
JP 2011-081382 A 4/2011

* cited by examiner

Primary Examiner — Kristal Feggins
(74) Attorney, Agent, or Firm — Canon USA Inc., IP Division

(57) ABSTRACT

An optical scanning apparatus includes a deflector configured to deflect a light beam from a light source to cause the light beam to scan a surface to be scanned in a main scanning direction, an incident optical system that includes a single incident optical element and is configured to guide the light beam from the light source to the deflector, and an image-forming optical system configured to condense the light beam having been deflected by the deflector as condensing points on the surface to be scanned. At least one of the incident optical system and the image-forming optical system includes a diffractive surface that corrects displacement amounts of the condensing points in a main scanning section and a sub scanning section when a wavelength of the light beam from the light source varies.

10 Claims, 5 Drawing Sheets

OPTICAL SCANNING APPARATUS AND IMAGE FORMING APPARATUS INCLUDING THE SAME

BACKGROUND

Field of the Disclosure

The present, disclosure generally relates to optical scanning, and in particular it relates to an optical scanning apparatus suitable for an image forming apparatus such as a laser beam printer (LBP), a digital copying machine, a multifunction printer, and the like.

Description of Related Art

Generally, an optical scanning apparatus used in an image forming apparatus includes a first optical system (herein "an incident optical system") that guides a light beam from a light source to a deflector, and a second optical system (herein "an image-forming optical system") that condenses the light beam deflected by the deflector to form a focused point (condensing point) on a surface to be scanned. To obtain high image quality, it is important to maintain appropriate control of condensing point. Japanese Patent Application Laid-Open No. 2006-154748 discusses an optical scanning apparatus whose overall size is reduced by configuring an incident optical system to include a single optical element and that can suppress displacement of the condensing point on a surface to be scanned due to variation of environmental temperature by providing a diffractive surface on the single optical element.

When a diffractive surface is provided in the incident optical system, it is necessary to adjust the distance between the light source and the incident optical system to correct the displacement of the condensing point due to the individual difference of the oscillation wavelength of the light source. However, in the apparatus discussed in Japanese Patent Application Laid-Open No. 2006-154748, the incident optical system includes a single optical element. Thus, it is difficult to adjust the positions of the condensing points in the main scanning section and the sub scanning section separately.

Japanese Patent Application Laid-open No. 2011-81382 discusses a structure in which a ratio of the magnification in the sub scanning section to the magnification in the main scanning section of the entire system is reduced to enable correction of the position of the condensing point in the main scanning section as well as suppression of the displacement of the condensing point on the sub scanning section when the distance between the light source and the incident optical system is adjusted.

However, when the distance between the deflector and the image-forming optical system is shortened to further reduce the size of the apparatus, it is necessary to increase the magnification in the sub scanning section of the image-forming optical system, making it difficult to reduce the magnification ratio described above. In this case, the magnification in the main scanning section can be also increased to reduce the magnification ratio. However, such structure results in an increase of the variation of the optical performance corresponding to the shape error and the placement error of each optical member.

SUMMARY

The present disclosure is directed to an optical scanning apparatus that is reduced in size and yet maintains good optical performance. An image forming apparatus including such optical scanning apparatus is also disclosed.

According to an aspect of at least one embodiment, an optical scanning apparatus includes a deflector configured to deflect a light beam, from a light source to cause the light beam to scan a surface to be scanned in a main scanning direction, an incident optical system that includes a single incident optical element and is configured to guide the light beam from the light source to the deflector, and an image-forming optical system configured to condense the light beam having been deflected by the deflector as condensing points on the surface to be scanned, wherein at least one of the incident optical system and the image-forming optical system includes a diffractive surface, and wherein the following expression is satisfied:

$$1.6 \leq |(s\Delta\lambda S - s\Delta\lambda M)/(s\Delta xS - s\Delta xM)| \leq 5.0$$

where $s\Delta\lambda M$ and $s\Delta\lambda S$ are displacement amounts of the condensing points by the image-forming optical system respectively in a main scanning section (M) and a sub scanning section (S) when a wavelength ($\lambda$) of the light beam from the light source varies by 10 nm ($\Delta\lambda$), and $s\Delta xS$ and $s\Delta xM$ are displacement amounts of the condensing points respectively in the main scanning section and the sub scanning section when the light source or the incident optical element moves 100 μm in an optical axis direction.

Further features of the present disclosure will become apparent from the following description of exemplary embodiments with reference to the attached drawings.

DESCRIPTION OF THE EMBODIMENTS

Figure 1:
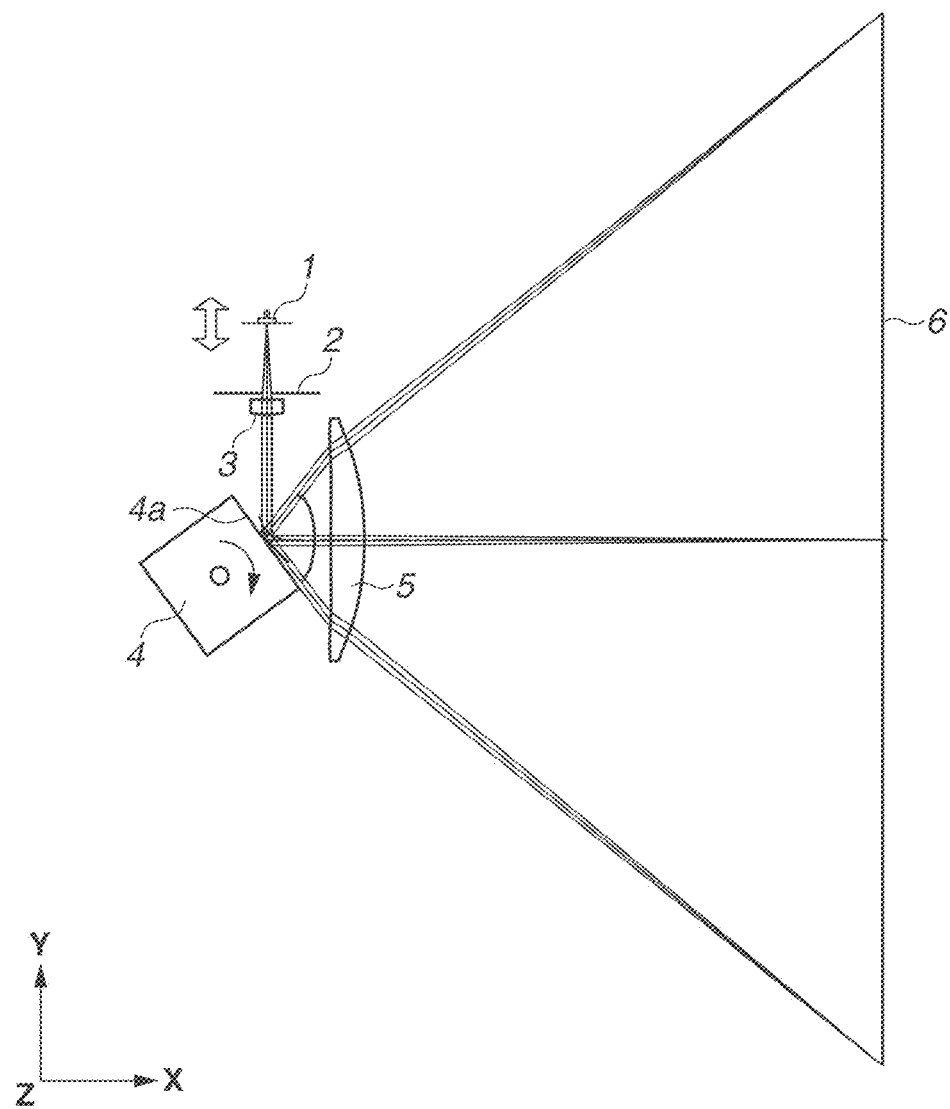
FIG. 1 is a schematic diagram illustrating a main part of an optical scanning apparatus according to a first exemplary embodiment.

Exemplary embodiments of the present disclosure will be described below with reference to the drawings. It is to be noted that the scale of each drawing may be different from the actual scale for the sake of convenience. Further, in the drawings, the same reference numerals are used to denote similar members, and the duplicate description thereof will not be provided.

In the following description, a main scanning direction is a direction perpendicular to the rotation axis of the deflector and the optical axis direction of the image-forming optical system (direction in which the surface to be scanned is scanned by the deflector), and a sub scanning direction is a direction parallel to the rotation axis of the deflector. The main scanning section is a cross section including the optical axis and a plane parallel to the main scanning direction, i.e., a cross section perpendicular to the sub scanning direction. The sub scanning section is a cross section including the optical axis of the image-forming optical system and a plane parallel to the sub scanning direction, i.e., a cross section perpendicular to the main scanning direction.

FIG. 1 is a schematic diagram illustrating a main part of an optical scanning apparatus 10 in the main scanning section (XY cross section), according to a first exemplary embodiment. The optical scanning apparatus 10 according to the present exemplary embodiment includes a light source 1, an aperture diaphragm 2, an incident optical system 3, a deflector 4, and an image-forming optical system 5. The optical scanning apparatus 10 scans a surface to be scanned 6 with a light beam in the main scanning direction (parallel to Y axis in FIG. 1) by causing the rotating deflector 4 to deflect the light beam. A non-illustrated folding mirror (reflecting member) may be disposed in the optical path from a deflecting surface 4a of the deflector 4 to the surface to be scanned 6 to bend the optical path of the light beam in the sub scanning section.

In the optical scanning apparatus 10, the cross-section of a light beam emitted from the light source 1 is shaped into an elliptical shape by the aperture diaphragm 2 having an elliptical opening; and the light beam having the elliptically shaped cross-section is guided to the deflecting surface 4a of the deflector 4 by the incident optical system 3. As the light source 1, for example, a semiconductor laser light source can be used, and the number of the light emitting points may be one or more. In the present exemplary embodiment, an elliptical diaphragm having an elliptical opening is used as the aperture diaphragm 2, but the shape of the opening is not limited to this, and for example, a rectangular diaphragm having a rectangular aperture may be used.

The incident optical system 3 according to the present exemplary embodiment includes a single optical element (incident lens) having different strengths of power in the main scanning section and the sub scanning section. The incident optical element is an anamorphic collimator lens that converts the light beam into a substantially parallel light beam in the main scanning section and condenses the light beam on the deflecting surface 4a or the vicinity thereof in the sub scanning section to form a line image that is long in the main scanning direction. Here, the substantially parallel light beam includes not only strictly parallel light but also weak convergent light and The incident optical system 3 according to the present exemplary embodiment is a plastic molded lens made of a resin material. Thus, significant reduction in manufacturing cost is possible as compared with a case where a glass lens is used. The incident optical system 3 is provided with a diffractive surface to allow compensation of focus variation when the oscillation wavelength of the light source 1 or the shape of each optical surface varies due to variation in environmental temperature. For example, when the environmental temperature rises from the room temperature, power of the refracting surface (refracting power) is weakened but the power of the diffractive surface is strengthened because the wavelength of a light beam becomes longer and the resin material is elongated. Thus, focus variation caused by the refracting surface and focus variation caused by the diffractive surface can be canceled.

The deflector 4 is rotated at a constant velocity in the arrow direction in FIG. 1 by a driving unit (not illustrated), and deflects a light beam from the incident optical system 3 at the deflecting surface 4a, thereby causing the light beam to scan an effective scan area (printing area) of the surface to be scanned 6 in the main scanning direction through the image-forming optical system 5. In the present exemplary embodiment, a rotary polygon mirror (polygon mirror) having four deflecting surfaces is used as the deflector 4, but the number of deflecting surfaces is not limited to four. In addition, instead of the rotary polygon mirror, a swinging mirror having one or two deflecting surfaces that swing around the swinging motion axis may be used.

The image-forming optical system 5 includes a single optical element (imaging lens) and guides and condenses the light beam having been deflected by the deflecting surface 4a onto the surface to be scanned 6 to form an image of the light source 1 on the surface to be scanned 6 or in the vicinity thereof in both the main scanning section and the sub scanning section. The image-forming optical system 5 is configured to make a conjugate relation between the deflecting surface 4a or the vicinity thereof and the surface to be scanned 6 or the vicinity thereof in the sub scanning section to reduce scanning position displacement on the surface to be scanned 6 when the deflecting surface 4a is tilted (optical face tangle error compensation).

The incident optical system 3 and the image-forming optical system 5 according to the present exemplary embodiment are plastic molded lenses formed by injection molding, but the incident optical system 3 and the image-forming optical system 5 are not limited to plastic molded lenses and may be glass lenses. However, in order to improve productivity and optical performance, a plastic molded lens, which is easy to form a diffractive surface and an aspheric shape and is suitable for mass production, may desirably be used. Further, as needed, the image-forming optical system 5 may include a plurality of imaging optical elements, but in order to realize reduction in size and cost of the apparatus, the image-forming optical system 5 may desirably include a single optical element.

Table 1 illustrates the structure of the optical scanning apparatus 10 according to the present exemplary embodiment. The on-axis deflection point in Table 1 indicates an intersection point of the deflecting surface 4a and the principal ray of the light beam (on-axis light beam) that has been emitted from the light source 1 and enters the on-axis image height on the surface to be scanned 6. The angle of the incident principal ray in the main scanning section indicates an angle formed by the principal ray of the light beam that has been emitted from the incident optical system 3 and enters the deflecting surface 4a and the optical axis of the image-forming optical system 5 in the main scanning section. Further, the main-scanning magnification and the sub-scanning magnification indicate the lateral magnifications in the main scanning section and the sub scanning section, respectively.

TABLE 1

| STRUCTURE OF THE OPTICAL SCANNING APPARATUS 10 | | |
| --- | --- | --- |
| Wavelength of Light Emitted From Light Source 1 | ($\lambda$) nm | 790 |
| Full Width at Half Maximum of Radiation Intensity of Light Source 1 in Main Scanning Section | $\theta y0$ (deg) | 12.0 |
| Full Width at Half Maximum of Radiation Intensity of Light Source 1 in Sub Scanning Section | $\theta z0$ (deg) | 28.0 |
| Distance From Light Emitting Point of Light Source 1 to Aperture Diaphragm 2 | d1 (mm) | 18.73 |
| Distance From Aperture Diaphragm 2 to Incidence Plane of Incident Optical System 3 | d2 (mm) | 1.30 |
| Phase Coefficient of Incidence Plane of Incident Optical System 3 | c20 c02 | −0.0222 −0.0259 |
| Curvature Radius of Incidence Plane of Incident Optical System 3 in Main Scanning Section | rm1 (mm) | ∞ |

TABLE 1-continued

STRUCTURE OF THE OPTICAL SCANNING APPARATUS 10

| | | |
|---|---|---|
| Curvature Radius of Incidence Plane of Incident Optical System 3 in Sub Scanning Section | rs1 (mm) | ∞ |
| Curvature Radius of Exit Plane of Incident Optical System 3 in Main Scanning Section | rm2 (mm) | −79.306 |
| Curvature Radius of Exit Plane of Incident Optical System 3 in Sub Scanning Section | rs2 (mm) | −13.830 |
| Thickness of Incident Optical System 3 (From Incidence Plane to Exit Plane) along optical axis of Incident Optical System 3 | d3 (mm) | 3.00 |
| Refractive Index of Incident Optical System 3 (Wavelength 790 nm) | n1 | 1.524 |
| Distance From Exit Plane of Incident Optical System 3 to On-axis Deflection Point of surface 4a along optical axis of Incident Optical System 3 | d4 (mm) | 25.670 |
| Distance From On-axis Deflection Point of surface 4a to Incidence Plane of Image-forming optical system 5 along optical axis of Image-forming optical system 5 | d5 (mm) | 13.800 |
| Thickness of Image-forming optical system 5 (From Incidence Plane to Exit Plane) along optical axis of Imge-forming optical system 5 | d6 (mm) | 6.000 |
| Refractive Index of Image-forming optical system 5 (Wavelength 790 nm) | n2 | 1.524 |
| Distance From Exit Plane of Image-forming optical system 5 to Surface to be Scanned 6 along optical axis of Image-forming optical system 5 | d7 (mm) | 105.20 |
| Angle of Incident Principal Ray in Main Scanning Section | α (deg) | 90.0 |
| Circumcircle Radius of Deflector 4 | Rpol (mm) | 20.0 |
| Number of Deflecting Surfaces 4a | number | 4 |
| Aperture Diameter of Aperture Diaphragm (Main Scan × Sub Scan) | Ellipse (mm) | 1.75 × 1.72 |
| Main-Scanning Magnification Incident Optical System 3 | βmi | −53.65 |
| Main-Scanning Magnification of Image-forming optical system 5 | βmo | 0.10 |
| Sub-Scanning Magnification of Incident Optical System 3 | βsi | −1.26 |
| Sub-Scanning Magnification of Image-forming optical system 5 | βso | −5.63 |
| Main-Scanning Magnifiction of Entire System | βm | −5.59 |
| Sub-Scanning Magnification of Entire System | βs | 7.08 |
| Distance From Light Emitting Point of Light Source 1 to Deflecting Surface 4a (Entire Length of Incident Optical System) | Li (mm) | 48.70 |
| Distance From on-axis deflection point 4a to Surface to be Scanned 6 (Entire Length of Image-forming optical system) | Lo (mm) | 125.00 |
| Effective Scan Width (Printing Width) | A (mm) | 210 |

SHAPE OF IMAGE-FORMING OPTICAL SYSTEM 5

| | | Incidence Plane | Exit Plane |
|---|---|---|---|
| Meridional Line | R | 9.74336E+01 | −1.82557E+02 |
| | K | −9.82071E+00 | 4.47224E+01 |
| | B2u | 0.00000E+00 | 0.00000E+00 |
| | B4u | −2.29094E−05 | −1.02275E−05 |
| | B6u | 4.50989E−08 | 1.20971E−10 |
| | B8u | −4.54708E−11 | 2.22753E−11 |
| | B10u | 1.39916E−14 | −2.16678E−14 |
| | B12u | 0.00000E+00 | 0.00000E+00 |
| | B14u | 0.00000E+00 | 0.00000E+00 |
| | B16u | 0.00000E+00 | 0.00000E+00 |
| | B21 | 0.00000E+00 | 0.00000E+00 |
| | B41 | −2.38680E−05 | −9.58073E−06 |
| | B61 | 4.55273E−08 | −5.48249E−10 |
| | B81 | −4.21085E−11 | 2.04208E−11 |
| | B101 | 1.20181E−14 | −1.60774E−14 |
| | B121 | 0.00000E+00 | 0.00000E+00 |
| | B141 | 0.00000E+00 | 0.00000E+00 |
| | B161 | 0.00000E+00 | 0.00000E+00 |
| | B1 | 0.00000E+00 | 0.00000E+00 |
| | B3 | −5.85183E−07 | 1.01028E−05 |
| Sagittal Line | r | −2.49020E+01 | −6.97386E+00 |
| | E2u | 4.26738E−05 | 1.77474E−04 |
| | E4u | −1.03302E−08 | −6.22117E−07 |
| | E6u | −2.00668E−10 | 1.19528E−09 |
| | E8u | 4.06442E−14 | −1.15053E−12 |
| | E10u | 0.00000E+00 | 0.00000E+00 |
| | E12u | 0.00000E+00 | 0.00000E+00 |
| | E14u | 0.00000E+00 | 0.00000E+00 |
| | E16u | 0.00000E+00 | 0.00E+00 |
| | E21 | 4.26738E−05 | −6.97386E+00 |
| | E41 | −1.03302E−08 | 1.77474E−04 |
| | E61 | −2.00668E−10 | −6.22117E−07 |
| | E81 | 4.06442E−14 | 1.19528E−09 |
| | E101 | 0.00000E+00 | −1.15053E−12 |
| | E121 | 0.00000E+00 | 0.00000E+00 |
| | E141 | 0.00000E+00 | 0.00000E+00 |
| | E161 | 0.00000E+00 | 0.00000E+00 |
| | E1 | −1.25287E−03 | −7.10851E−04 |
| | E3 | 2.88871E−06 | −2.32774E−07 |
| | E5 | −4.39058E−09 | 1.71214E−09 |
| | E7 | 1.74766E−12 | −3.27785E−12 |
| | E9 | 0.00000E+00 | 0.00000E+00 |

The shape x of each optical surface (lens surface) of the image-forming optical system 5 according to the present exemplary embodiment is defined by the following expressions (1) to (4) where the intersection of the optical surface and the optical axis is set to the origin, the axis in the optical axis direction is set to the X axis, the axis orthogonal to the optical axis in the main scanning section is set to the Y axis, and the axis orthogonal to the optical axis in the sub scanning section is set to the Z axis.

$$x = X + S \tag{1}$$

$$X = \frac{\frac{Y^2}{R}}{1 + \sqrt{1 - (1+K)\left(\frac{Y}{R}\right)^2}} + \sum_{i}^{16} B_i Y^i \tag{2}$$

$$S = \frac{\frac{z^2}{r'}}{1 + \sqrt{1 - (1+K)\left(\frac{z}{r'}\right)^2}} \tag{3}$$

$$r' = 1 \Big/ \left(\frac{1}{r} + \sum_{i}^{16} E_i Y^i\right) \tag{4}$$

Expression (2) represents the shape of the optical surface in the main scanning section (meridional shape), and Expression (3) represents the shape of the optical surface at the image height Y in the ZX cross section (sagittal shape). The curvature radius r' in the ZX cross section of the optical surface varies according to the value of Y as indicated, in Expression (4). In expressions (2) and (4), the aspheric coefficients are set on the assumption that a case where Y>0 is indicated as "upper" and a case where Y<0 is indicated as "lower", and each aspheric coefficient is indicated in Table 1 with i=u in the case of "upper" and i=1 in the case of "lower".

Here, in order to provide the fθ characteristic (constant-velocity characteristic) to the image-forming optical system 5, the shape of the optical surface in the main scanning section has to be greatly different between the on-axis image height and the off-axis image height. At this time, when the image-forming optical system 5 is brought too close to the deflector 4, the shape variation of the optical surface in the main scanning section becomes steep, and coma aberration increases. Therefore, in order to achieve both the optical performance and the fθ characteristic of the image-forming optical system 5, the image-forming optical system 5 has to be located away from the deflector 4 to some extent.

Therefore, the image-forming optical system 5 according to the present exemplary embodiment has such a scanning characteristic that a light beam passing through the image-forming optical system 5 does not satisfy evenness of velocity in the surface to be scanned 6. This allows positioning of the image-forming optical system 5 close to the deflector 4 while maintaining the optical performance, and can further reduce the diameter of the entire apparatus. The scanning characteristic of the image-forming optical system 5 according to the present exemplary embodiment is represented by the following Expression (5) where the scanning angle (scanning field angle) by the deflector 4 is θ, the condensing position (image height) of a light beam deflected with the scanning angle θ in the main scanning direction in the surface to be scanned 6 is Y [mm], and the imaging coefficient at the on-axis image height is f [mm].

$$Y = F \times \theta + \gamma \times \theta^3 \quad (5)$$

Note that the imaging coefficient F is a coefficient corresponding to f in the fθ characteristic: Y=f×θ, which is a scanning characteristic when parallel light enters the image-forming optical system 5, and is a coefficient to extend the fθ characteristic to light beams other than parallel light. In other words, the imaging coefficient F is a coefficient to make the relationship between the condensing position Y and the scanning angle θ to be proportional when a light beam having any convergence including parallel light enters the image-forming optical system 5. In the present exemplary embodiment, the imaging coefficient F=106.7 at the on-axis image height.

The coefficient γ in Expression (5) is a coefficient for determining the scanning characteristic of the image-forming optical system 5 according to the present exemplary embodiment (scanning characteristic coefficient), and γ=12.6 in the present exemplary embodiment. For example, when γ=0, Expression (5) can be expressed Y=F=θ and corresponds to the fθ characteristic. However, when γ≠0, Expression (5) represents a scanning characteristic in which the condensing position Y and the scanning angle θ are not proportional. The expression expressing the scanning characteristics of the image-forming optical system 5 is not limited to the above Expression (5).

Here, when Expression (5) is differentiated by the scanning angle θ, the scanning velocity of the light bean on the surface to be scanned 6 for the scanning angle θ is obtained as expressed by the following Expression (6).

$$dY/d\theta = F + 3\gamma \times \theta^2 \quad (6)$$

Further, when Expression (6) is divided by the velocity dY(0)/dθ=F at the on-axis image height, the following Expression (7) is obtained.

$$(dY/d\theta)/F = 1 + 3\gamma \times \theta^2 / F \quad (7)$$

Expression (7) represents the amount of deviation of the evenness of velocity at each off-axis image height with respect to the on-axis image height, i.e., amount of deviation of the partial magnification at the off-axis image height with respect to the partial magnification at the on-axis image height (deviation of partial magnification). Since the optical scanning apparatus 10 according to the present exemplary embodiment has partial magnifications, when γ≠0, the scanning velocity of the light beam is different at the on-axis image height and at the off-axis image height. In other words, movement of the scanning position is fast (scanning distance per unit time is long) at the off-axis image height according to the deviation of partial magnification. Thus, if the surface to be scanned 6 is optically scanned without considering the deviation of partial magnification, an image formed on the surface to be scanned 6 is deteriorated (printing performance is deteriorated).

Therefore, in the present exemplary embodiment, the light emission of the light source 1 is controlled by a control unit (not illustrated) according to the deviation of partial magnification when γ≠0. Specifically, the modulation timing (light emission timing) and the modulation time (light emission time) of the light source 1 can be controlled, to electrically correct the scanning position and the scanning time of the surface to be scanned 6. This makes it possible to correct partial magnification deviation and image deterioration to obtain good printing performance as in the case where the fθ characteristic is satisfied.

In the image-forming optical system 5 according to the present exemplary embodiment, the absolute value of the sub-scanning magnification is larger than the absolute value of the main-scanning magnification. This makes it possible to shorten the distance between the deflector 4 and the image-forming optical system 5, which contributes to further downsizing of the entire apparatus. When the absolute value of the sub-scanning magnification of the image-forming optical system 5 is set to a value larger than 4, the entire apparatus can be sufficiently downsized.

The Incidence Plane of the incident optical system 3 according to the present exemplary embodiment is a diffractive surface on which a diffraction grating is formed. However, as needed, the Exit Plane of the incident optical system 3 may be a diffractive surface, or a diffractive surface may be provided on the image-forming optical system 5. When the diffraction order of the diffractive surface of the incident optical system 3 is m (m=1 in the present exemplary embodiment) and the design wavelength is λ, the phase function Φ of the diffraction grating is expressed by the following Expression (8).

$$\phi = \frac{2\pi}{m\lambda} \sum_{i,j} C_{i,j} Y^i Z^j \quad (8)$$

It is known that there is an individual difference of about ±10 nm in the oscillation wavelength of a semiconductor laser used as the light source 1 due to manufacturing variations and the like. Since the power of the diffractive surface depends on the oscillation wavelength of the light source 1, the position of the condensing point (imaging point) of the light beam condensed by the image-forming optical system 5 varies depending on the individual difference of the light source 1. Therefore, the distance between the light source 1 and the incident optical system 3 can be adjusted to reduce the positional displacement, of the condensing point with respect to the surface to be scanned 6. Specifically, the position of the condensing point may be measured and at least one of the light source 1 and the incident optical system 3 may be moved in the optical axis direction according to the measurement result to adjust the distance.

Next, the relationship between the adjustment sensitivity and the wavelength sensitivity of the optical scanning apparatus 10 according to the present exemplary embodiment will be described.

The displacement amount of the condensing point by the image-forming optical system 5 when one of the light source 1 and the incident optical system 3 is fixed and the other one is moved as an adjusting member 100 μm in the optical axis direction is defined as an adjustment sensitivity sΔx. The adjustment sensitivity sΔx is expressed by the following Expression (9) where the lateral magnification of the adjustment member is $\beta_a$ and the lateral magnifications of optical members disposed closer to the surface to be scanned 6 than (downstream of) the adjusting member are $\beta_b$, $\beta_c$, . . . .

$$s\Delta x = (1-\beta_a^2) \times \beta_b^2 \times \beta_c^2 \times \ldots \quad (9)$$

As understood from Expression (9), the adjustment sensitivity sΔx is a value determined depending on the selection and arrangement of optical members. Note that the lateral magnification $\beta_a$ is set to 0 when the light source 1 is selected as the adjustment member. Further, when the adjustment sensitivities in the main scanning section and the sub scanning section are sΔxM and sΔxS, respectively, the adjustment sensitivity ratio SM(sΔx) and the adjustment sensitivity astigmatism AS(sΔx) are respectively represented by the following expressions (10) and (11).

$$SM(s\Delta x) = s\Delta xS/s\Delta xM \quad (10)$$

$$AS(s\Delta x) = (s\Delta xS - s\Delta xM) \quad (11)$$

The displacement amount of the condensing point when the wavelength of the light beam from the light source 1 (oscillation wavelength) varies by 10 nm from the design wavelength is defined as the wavelength sensitivity sΔλ. In addition, the wavelength sensitivities in the main scanning section and the sub scanning section are defined as sΔλM and sΔλS, respectively. The wavelength sensitivity ratio SM(sΔλ) and the wavelength sensitivity astigmatism AS(sΔλ) are expressed by the following expressions (12) and (13).

$$SM(s\Delta\lambda) = s\Delta\lambda S/s\Delta\lambda M \quad (12)$$

$$AS(s\Delta\lambda) = s\Delta\lambda S - s\Delta\lambda M \quad (13)$$

The wavelength sensitivity sΔλ is a value that depends on the power of the diffractive surface. Further, the value of the ratio of the wavelength sensitivity ratio SM(sΔλ) to the adjustment sensitivity ratio SM(sΔx) is defined as the sensitivity ratio SM(sΔλ)/SM(sΔx) of the optical scanning apparatus 10. Further, the absolute value of the value of the ratio of the wavelength sensitivity astigmatism AS(sΔλ) to the adjustment sensitivity astigmatism AS(sΔx) is defined as the astigmatism sensitivity ratio |AS(sΔλ)/AS(sΔx)| of the optical scanning apparatus 10.

The numerical values relating to the adjustment sensitivity and the wavelength sensitivity of the present exemplary embodiment are provided in Table 2 below.

TABLE 2

|  |  | MAIN SCANNING SECTION | SUB SCANNING SECTION |
|---|---|---|---|
| Adjustment Sensitivity | sΔxM, sΔxS | 3.12 | 5.02 |
| Adjustment Sensitivity Ratio | SM (sΔx) | 1.61 | |
| Adjustment Sensitivity Astigmatism | AS (sΔx) | 1.90 | |
| Wavelength Sensitivity | sΔλM, sΔλS | −6.64 | −10.91 |
| Wavelength Sensitivity Ratio | SM (sΔλ) | 1.64 | |
| Wavelengh Sensitivity Astigmatism | AS (sΔλ) | −4.27 | |
| Sensitivity Ratio | SM (sΔλ)/SM (sΔx) | 1.02 | |
| Astigmatism Sensitivity Ratio | |AS (sΔλ)/AS (sΔx)| | 2.25 | |

Figure 2:
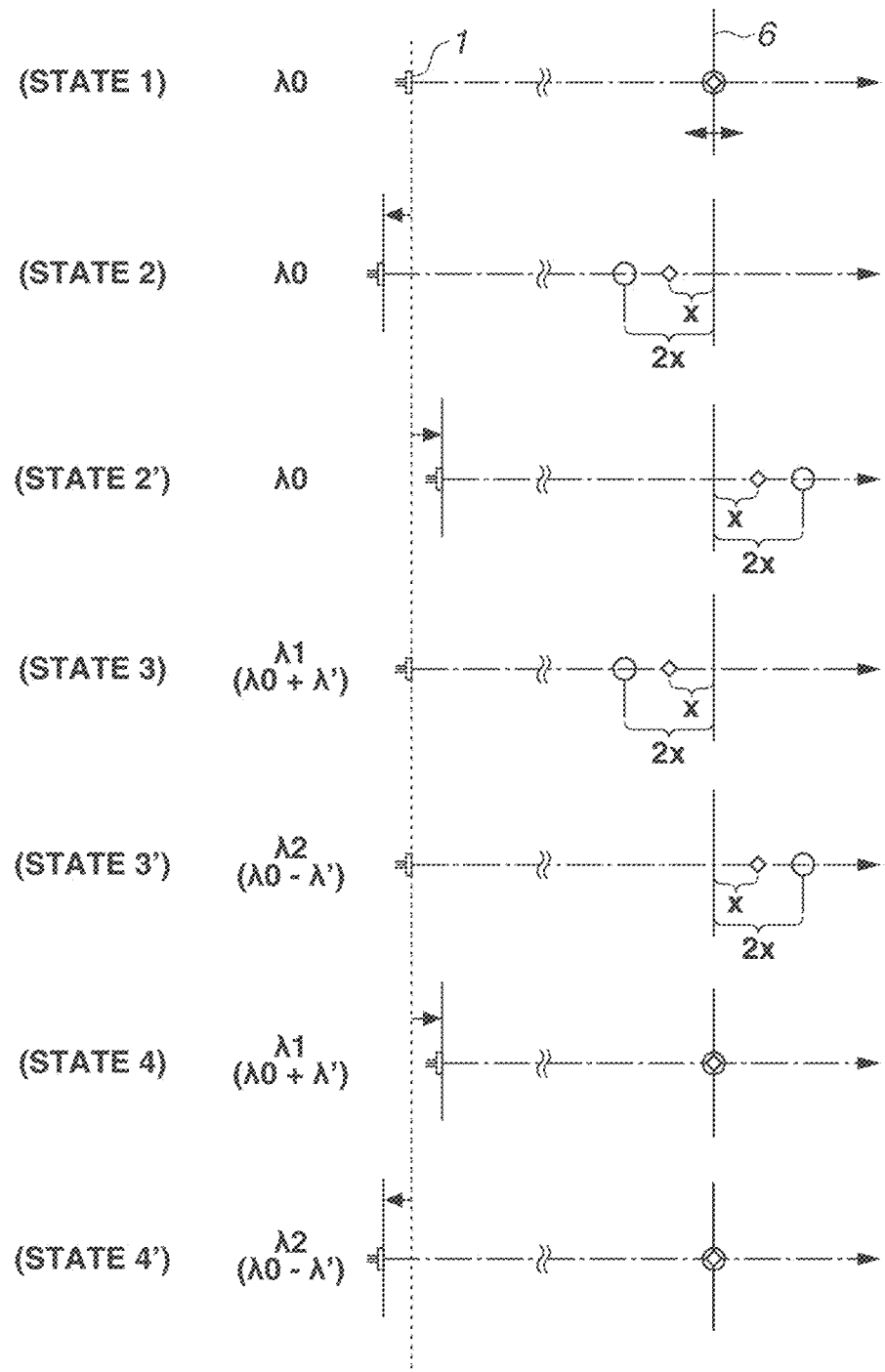
FIG. 2 is a diagram illustrating an adjustment sensitivity and a wavelength sensitivity of the optical scanning apparatus.

Here, with reference to FIG. 2, the relationship between the adjustment sensitivity and the wavelength sensitivity will be qualitatively described. FIG. 2 illustrates a schematic diagram of a structure in which an optical system is disposed between the light source 1 and the surface to be scanned 6. In the optical system, the axial magnification in the sub scanning section is twice the axial magnification in the main scanning section, and the optical system includes a diffractive surface. In FIG. 2, the position of the condensing point in the main scanning section is indicated by a rhomboid (◇) sign, the position of the condensing point in the sub scanning section is indicated by a circle (○), and the optical axis of the optical system is indicated by a dashed-dotted line.

In FIG. 2, a state 1 illustrates a design state (ideal state) in which both the condensing points in the main scanning section and the sub scanning section are on the surface to be scanned 6. The oscillation wavelength (design wavelength) of the light source 1 in the state 1 is defined to be λ0. The states 2 and 2' are states after the light source 1 is moved on the optical axis in the direction away from the surface to be scanned 6 and in the direction towards the surface to be scanned 6, respectively. In other words, the states indicate the adjustment sensitivity of this optical system.

The ratio of the axial magnifications in the main scanning section and the sub scanning section is 1:2. Thus, when the position of the condensing point in the main scanning section varies by a distance x toward the front-focused direction (toward the light source 1) from the state 1 to the state 2, the position of the condensing point in the sub scanning section varies by a distance 2x toward, the front-focused direction. When the position of the condensing point in the main scanning section varies by a distance x toward the rear-focused direction (away from the light source 1) from the state 1 to the state 2', the position of the condensing point in the sub scanning section varies by a distance 2x toward the rear-focused direction.

The states 3 and 3' are states after the oscillation wavelength of the light source 1 varies to be longer than the design wavelength λ0 and shorter than the design wavelength λ0, respectively. In other words, the states 3 and 3' indicate the wavelength sensitivity of the optical system. Note that the oscillation wavelength of the light source 1 in the state 3 is λ1=λ0+λ'(λ' is a positive real number), and the oscillation wavelength of the light source 1 in the state 3' is λ2=λ0−λ'. From the state 1 to state 3, the oscillation wavelength of the light source 1 becomes longer, and the power of the diffractive surface then becomes stronger.

Thus, the position of the condensing point varies toward the front-focused direction. From the state 1 to the state 3', the oscillation wavelength of the light source 1 becomes shorter, and the power of the diffractive surface then becomes weaker. Thus, the position of the condensing point varies toward the rear-focused direction.

In this optical system, the power of the diffractive surface is set in such a manner that the ratio of the displacement of the condensing point in the main scanning section to the displacement of the condensing point in the sub scanning section due to the variation of the oscillation wavelength of the light source 1 is 1:2. As a result, even when the position of the condensing point deviates toward the front-focused direction as in the state 3, the light source 1 can be moved as illustrated as the state 2' to correct the position of the condensing point as illustrated as in the state 4. Even when the position of the condensing state 3', the light source 1 can be moved as illustrated as in the state 2 to correct the position of the condensing point as illustrated as in the state 4'.

Therefore, when the adjustment sensitivity ratio and the wavelength sensitivity ratio between the main scanning section and the sub scanning section is appropriately set, the position of the condensing point can be satisfactorily corrected by adjustment of the position of the light source 1 even when there is an individual difference in the oscillation wavelength of the light source 1. In FIG. 2, it is assumed that the position of the light source 1 is adjusted, but the position of the incident optical system 3 can be adjusted similarly.

The optical scanning apparatus 10 according to the present exemplary embodiment is configured to satisfy the following conditional expression (14). The second side of conditional expression (14) is the astigmatism sensitivity ratio $|AS\ (s\Delta\lambda)/AS(s\Delta x)|$.

$$1.6 \leq |(s\Delta\lambda S - s\Delta\lambda M)/(s\Delta xS - s\Delta xM)| \leq 5.0 \quad (14)$$

When the astigmatism sensitivity ratio is lower than the lower limit of the conditional expression (14), the power of the diffractive surface becomes too weak to compensate the focus variation due to variation of the environmental temperature. When the astigmatism sensitivity ratio is higher than the upper limit of the conditional expression (14), the amount of movement of the light source or the incident optical system necessary for adjusting the position of the condensing point increases. As a result, adjustment is difficult, and the Fno of the incident optical system varies greatly. This will be described in detail with reference to FIGS. 3A and 3B.

Figure 3A:
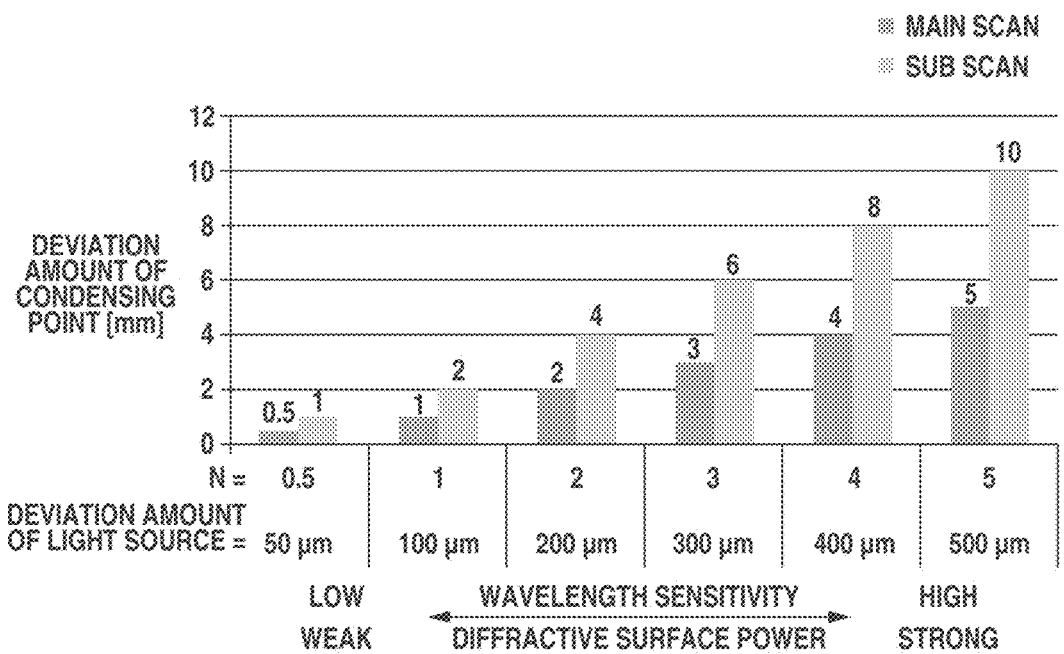
FIGS. 3A and 3B are diagrams respectively illustrating the wavelength sensitivity and an astigmatism sensitivity ratio of the optical scanning apparatus.

FIG. 3A illustrates design patterns of the diffractive surface in an optical system in which when the light source 1 is moved 100 μm in the optical axis direction, the position of the condensing point in the main scanning section varies by 1 mm and the position of the condensing point in the sub scanning section varies by 2 mm. FIG. 3A illustrates the relationship between the displacement amount of the light source 1 and the displacement amount of the condensing point when N=0.5, 1, 2, 3, 4, and 5 where the sensitivity ratio $SM(s\Delta\lambda)/SM(s\Delta x) = N$.

For example, in a case of N=1, when the oscillation wavelength of the light source 1 varies by 10 nm, the power of the diffractive surface may be set in such a manner that the position of the condensing point in the main scanning section varies by 1 mm and the position of the condensing point in the sub scanning section varies by 2 mm in the direction opposite to the direction when the light source 1 is moved. With this setting, when the oscillation wavelength of the light source 1 varies by 10 nm, the light source 1 can be moved by 100 μm, whereby the displacement of the condensing points can be corrected. When N is a positive real number other than 1, the power of the diffractive surface necessary for correcting the displacement of the condensing point is stronger according to the magnitude of N.

Figure 3B:
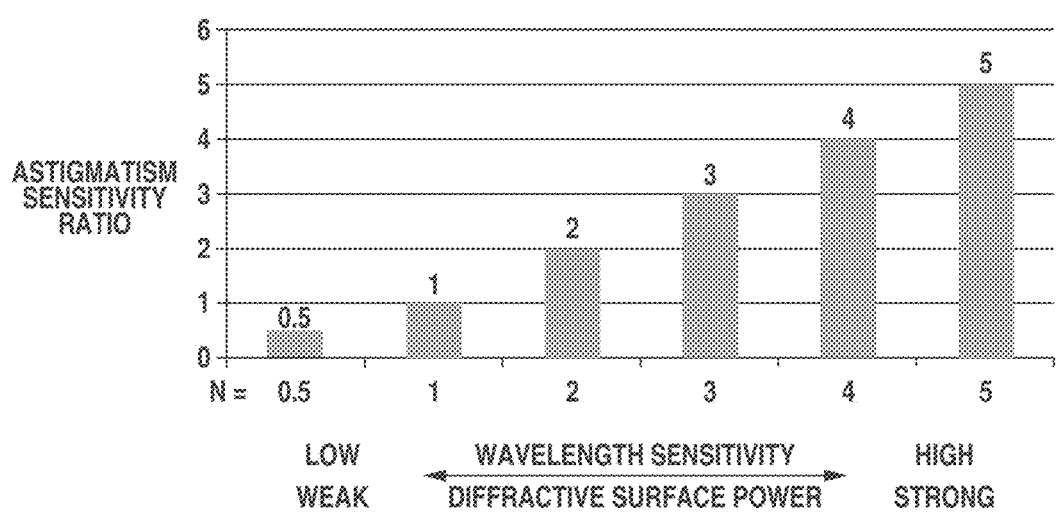

FIG. 3B illustrates the astigmatism sensitivity ratio of the optical system corresponding to FIG. 3A. When the wavelength sensitivity is low and the astigmatism sensitivity ratio is small, the displacement of the condensing points due to the individual difference of the oscillation wavelength of the light source is little. Thus, adjustment of the position of the condensing point is unnecessary. However, in that case, the power of the diffractive surface becomes too weak to compensate the focus variation due to variation of the environmental temperature. When the wavelength sensitivity is high and the astigmatism sensitivity ratio is large, the displacement of the condensing points due to the individual difference of the oscillation wavelength of the light source is large. As a result, correction of the displacement is difficult.

Therefore, when the power of the diffractive surface is appropriately set to satisfy the conditional expression (14), both correction of the displacement of the condensing points due to the individual difference of the oscillation wavelength of the light source and compensation of the focus variation due to variation of the environmental temperature can be achieved. It is further preferable that the following conditional expression (15) may is satisfied.

$$2.0 \leq |(s\Delta\lambda S - s\Delta\lambda M)/(s\Delta xS - s\Delta xM)| \leq 3.0 \quad (15)$$

The astigmatism sensitivity ratio of the optical scanning apparatus 10 according to the present exemplary embodiment is 2.25, which satisfies the conditional expressions (14) and (15). In addition, the optical scanning apparatus 10 according to the present exemplary embodiment may be preferably configured to satisfy the following conditional expression (16). The second side of the conditional expression (16) is the sensitivity ratio $SM(s\Delta\lambda)/SM(s\Delta x)$.

$$0.8 \leq (s\Delta\lambda S/s\Delta\lambda M)/(s\Delta xS/s\Delta xM) \leq 1.2 \quad (16)$$

When the conditional expression (16) is satisfied, the adjustment sensitivity ratio and the wavelength sensitivity ratio can be close to each other in each of the main scanning section and in the sub scanning section, i.e., the sensitivity ratio of the optical scanning apparatus 10 can be close to 1. In a case where the conditional expression (16) is not satisfied, when there is an individual difference of the oscillation wavelength of the light source 1 due to a large difference between the adjustment sensitivity ratio and the wavelength sensitivity ratio, it is difficult to satisfactorily correct the positions of the condensing points even if the distance between the light source 1 and the incident optical system 3 is adjusted. The sensitivity ratio of the optical scanning apparatus 10 according to the present exemplary embodiment is 1.02, which satisfies the conditional expression (16).

As described above, according to the optical scanning apparatus 10 of the present exemplary embodiment, a reduction in size can be realized while maintaining good optical performance.

An optical scanning apparatus 20 according to a second exemplary embodiment will be described in detail below with reference to FIG. 4. In the optical scanning apparatus 20 according to the present exemplary embodiment, description of the same structure as the optical scanning apparatus 10 according to the above-described first exemplary embodiment is not repeated.

Figure 4:
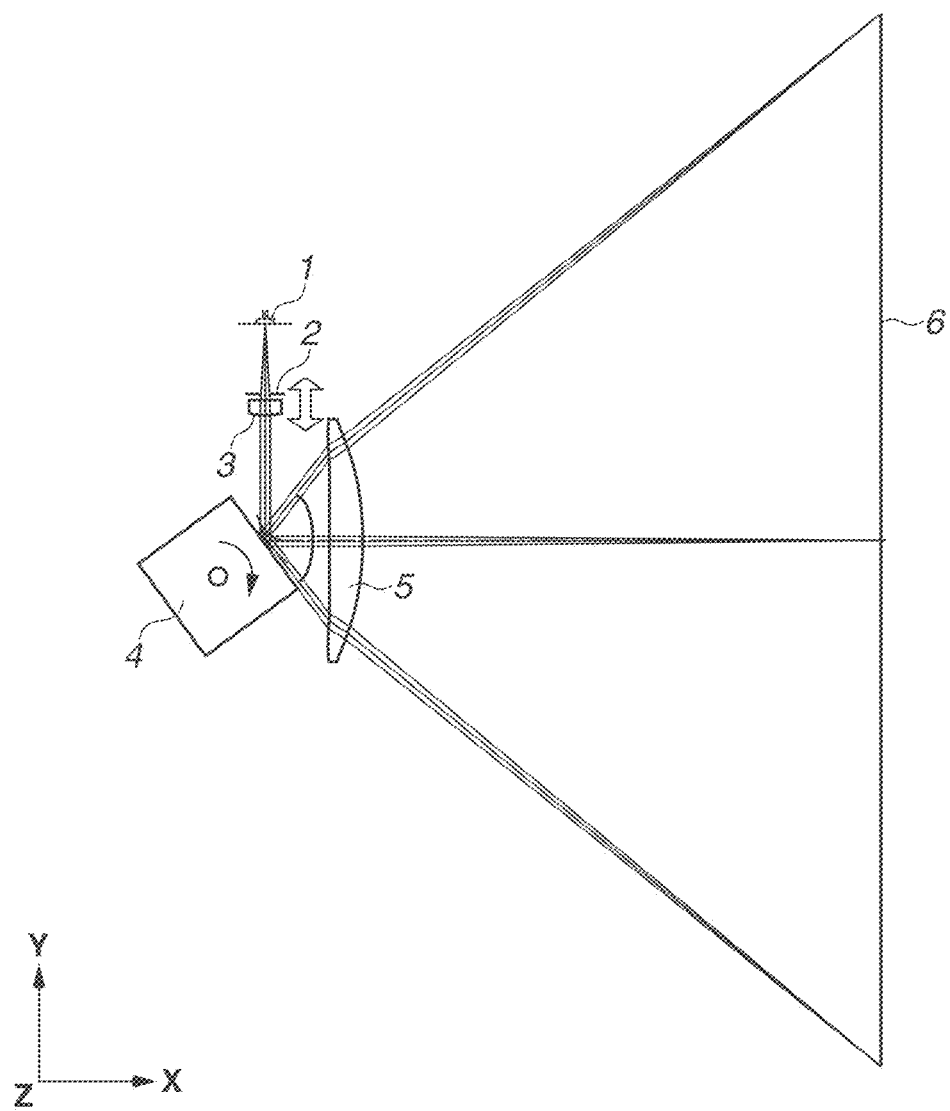
FIG. 4 is a schematic diagram illustrating a main part of an optical scanning apparatus according to a second exemplary embodiment.

FIG. 4 is a schematic view of a main part of the optical scanning apparatus 20 according to the present exemplary embodiment in the main scanning section. The optical scanning apparatus 20 has a similar structure to the optical scanning apparatus 10 according to the first exemplary embodiment except for the shape of an incident optical system 3. However, in the optical scanning apparatus 20, it is assumed that the position of the incident optical system 3 is adjusted instead of the light source 1. The following Table 3 illustrates the structure of the optical scanning apparatus 20.

TABLE 3

STRUCTURE OF THE OPTICAL SCANNING APPARATUS 20

| | | |
|---|---|---|
| Wavelength of Light Emitted From Light Source 1 (Oscillation Wavelength) | ($\lambda$) nm | 790 |
| Full Angle at Half Maximum of Radiation Intensity of Light Source 1 in Main Scanning Section | $\theta y0$ (deg) | 12.0 |
| Full Angle at Half Maximum of Radiation Intensity of Light Source 1 in Sub Scanning Section | $\theta z0$ (deg) | 28.0 |
| Distance From Light Emitting Point of Light Source 1 to Aperture Diaphragm 2 | d1 (mm) | 18.73 |
| Distance From Aperture Diaphragm 2 to Incidence Plane of Incident Optical System 3 | d2 (mm) | 1.30 |
| Phase Coefficient of Incidence Plane of Incident Optical System 3 | c20 c02 | −0.0255 −0.0099 |
| Curvature Radius of Incidence Plane of Incident Optical System 3 in Main Scanning Section | rm1 (mm) | ∞ |
| Curvature Radius of Incidence Plane of Incident Optical System 3 in Sub Scanning Section | rs1 (mm) | ∞ |
| Curvature Radius of Exit Plane of Incident Optical System 3 in Main Scanning Section | rm2 (mm) | ∞ |
| Curvature Radius of Exit Plane of Incident Optical System 3 in Sub Scanning Section | rs2 (mm) | −7.700 |
| Thickness of Incident Optical System 3 (From Incidence Plane to Exit Plane) along optical axis of Incident Optical System 3 | d3 (mm) | 3.00 |
| Refractive Index of Incident Optical System 3 (Wavelength 790 nm) | n1 | 1.524 |
| Distance From Exit Plane of Incident Optical System 3 to On-axis Deflection Point 4a along optical axis of Incident Optical System 3 | d4 (mm) | 25.670 |
| Distance From On-axis Deflection Point of surface 4a to Incidence Plane of Image-forming optical system 5 along optical axis of Image-forming optical system 5 | d5 (mm) | 13.800 |
| Thickness of Image-forming optical system 5 (From Incidence Plane to Exit Plane) along optical axis of Image-forming optical system 5 | d6 (mm) | 6.000 |
| Refractive Index of Image-forming optical system 5 (Wavelength 790 nm) | n2 | 1.524 |
| Distance From Exit Plane of Image-forming optical system 5 to Surface to be Scanned 6 along optical axis image-forming optical system 5 | d7 (mm) | 105.20 |
| Angle of Incident Principal Ray in Main Scanning Section | $\alpha$ (deg) | 90.0 |
| Circumcircle Radius of Deflector 4 | Rpol (mm) | 20.0 |
| Number of Deflecting Surfaces 4a | number | 4 |
| Aperture Diameter of Aperture Diaphragm (Main Scan × Sub Scan) | Ellipse (mm) | 1.75 × 1.72 |
| Main-Scanning Magnification of Incident Optical System 3 | $\beta mi$ | −54.36 |
| Main-Scanning Magnification of Image-forming optical system 5 | $\beta mo$ | 0.10 |
| Sub-Scanning Magnification of Incident Optical System 3 | $\beta si$ | −1.19 |
| Sub-Scanning Magnification of Image-forming optical system | $\beta so$ | −5.63 |
| Main-Scanning Magnification of Entire System | $\beta m$ | −5.60 |
| Sub-Scanning Magnification of Entire System | $\beta s$ | 6.70 |

TABLE 3-continued

STRUCTURE OF THE OPTICAL SCANNING APPARATUS 20

| | | |
|---|---|---|
| From Light Emitting Point of Light Source 1 to Deflecting Surface 4a (Entire Length of Incident Optical System) | Li (mm) | 48.70 |
| From on-axis deflection point 4a to Surface to be Scanned 6 (Entire Length of Image-forming optical system) | Lo (mm) | 125.00 |
| Effective Scan Width (Printing Width) | A (mm) | 210 |

SHAPE OF IMAGE-FORMING OPTICAL SYSTEM 5

| | | Incidence Plane | Exit Plane |
|---|---|---|---|
| Meridional Line | R | 9.74336E+01 | −1.82557E+02 |
| | K | −9.82071E+00 | 4.47224E+01 |
| | B2u | 0.00000E+00 | 0.00000E+00 |
| | B4u | −2.29094E−05 | −1.02275E−05 |
| | B6u | 4.50989E−08 | 1.20971E−10 |
| | B8u | −4.54708E−11 | 2.22753E−11 |
| | B10u | 1.39916E−14 | −2.16676E−14 |
| | B12u | 0.00000E+00 | 0.00000E+00 |
| | B14u | 0.00000E+00 | 0.00000E+00 |
| | B16u | 0.00000E+00 | 0.00000E+00 |
| | B21 | 0.00000E+00 | 0.00000E+00 |
| | B41 | −2.38680E−05 | −9.58073E−06 |
| | B61 | 4.55273E−08 | −5.48249E−10 |
| | B81 | −4.21085E−11 | 2.04208E−11 |
| | B101 | 1.20181E−14 | −1.60774E−14 |
| | B121 | 0.00000E+00 | 0.00000E+00 |
| | B141 | 0.00000E+00 | 0.00000E+00 |
| | B161 | 0.00000E+00 | 0.00000E+00 |
| | B1 | 0.00000E+00 | 0.00000E+00 |
| | B3 | −5.85183E−07 | 1.01028E−05 |
| Sagittal Line | r | −2.49020E+01 | −6.97386E+00 |
| | E2u | 4.26738E−05 | 1.77474E−04 |
| | E4u | −1.03302E−08 | −6.22117E−07 |
| | E6u | −2.00668E−10 | 1.19528E−09 |
| | E8u | 4.06442E−14 | −1.15053E−12 |
| | E10u | 0.00000E+00 | 0.00000E+00 |
| | E12u | 0.00000E+00 | 0.00000E+00 |
| | E14u | 0.00000E+00 | 0.00000E+00 |
| | E16u | 0.00000E+00 | 0.00E+00 |
| | E21 | 4.26736E−05 | −6.97386E+00 |
| | E41 | −1.03302E−08 | 1.77474E−04 |
| | E61 | −2.00668E−10 | −6.22117E−07 |
| | E81 | 4.06442E−14 | 1.19528E−09 |
| | E101 | 0.00000E+00 | −1.15053E−12 |
| | E121 | 0.00000E+00 | 0.00000E+00 |
| | E141 | 0.00000E+00 | 0.00000E+00 |
| | E161 | 0.00000E+00 | 0.00000E+00 |
| | E1 | −1.25287E−03 | −7.10851E−04 |
| | E3 | 2.88871E−06 | −2.32774E−07 |
| | E5 | −4.39058E−09 | 1.71214E−09 |
| | E7 | 1.74766E−12 | −3.27785E−12 |
| | E9 | 0.00000E+00 | 0.00000E+00 |

In addition, the numerical values relating to the adjustment sensitivity and the wavelength sensitivity of the present exemplary embodiment are provided in Table 4 below.

TABLE 4

| | | MAIN SCANNING SECTION | SUB SCANNING SECTION |
|---|---|---|---|
| Adjustment Sensitivity | s$\Delta$xM, s$\Delta$xS | −3.20 | −1.32 |
| Adjustment Sensitivity Ratio | SM (s$\Delta$x) | | 0.41 |
| Adjustment Sensitivity | AS (s$\Delta$x) | | 1.89 |

TABLE 4-continued

|  | | MAIN SCANNING SECTION | SUB SCANNING SECTION |
|---|---|---|---|
| Astigmatism Wavelength Sensitivity | sΔλM, sΔλS | −7.84 | −3.50 |
| Wavelength Sensitivity Ratio | SM (sΔλ) | | 0.45 |
| Wavelengh Sensitivity | AS (sΔλ) | | 4.34 |
| Astigmatism Sensitivity Ratio | SM (sΔλ)/SM (sΔx) | | 1.09 |
| Astigmatism Sensitivity Ratio | \|AS (sΔλ)/AS (sΔx)\| | | 2.30 |

In the optical scanning apparatus 20 of the present exemplary embodiment, the astigmatism sensitivity ratio is 2.30, and the sensitivity ratio is 1.09, which satisfy the conditional expressions (14) to (16).

Figure 5:
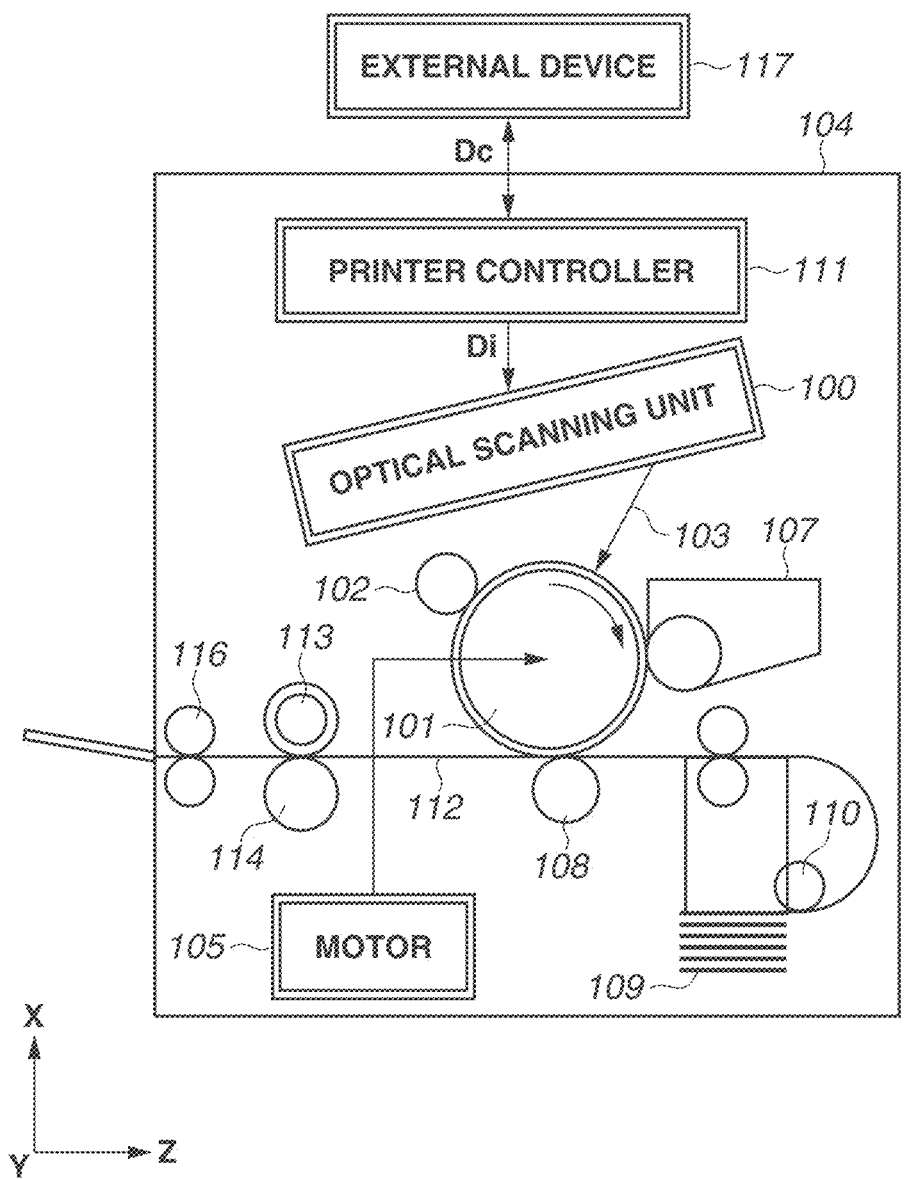
FIG. 5 is a cross-sectional diagram illustrating a main part of an image forming apparatus according to an exemplary embodiment.

FIG. 5 is a schematic view of a main part of an image forming apparatus 104 (sub scanning sectional view), according to an exemplary embodiment. The image forming apparatus 104 includes an optical scanning apparatus (optical scanning unit) 100 according to the above-described first or second exemplary embodiment.

As illustrated in FIG. 5, code data Dc output from an external device 117 such as a personal computer is input to the image forming apparatus 104. The code data Dc is converted into an image signal (dot data) Di by a printer controller 111 in the image forming apparatus 104, and input to the optical scanning unit 100. The optical scanning unit 100 emits a light beam 103 modulated according to the image signal Di. By the light beam 103, the photosensitive surface (surface to be scanned) of a photosensitive drum 101 is scanned in the main scanning direction. The printer controller 111 performs not only the above-described conversion of data but also control of each part in the image forming apparatus 104 such as a motor 115 to be described below.

The photosensitive drum 101 as an electrostatic latent image bearing member (photosensitive member) is rotated clockwise by the driving force of the motor 115. With this rotation, the photosensitive surface of the photosensitive drum 101 moves in the sub scanning direction with respect to the light beam 103. At a position higher than the photosensitive drum 101, a charging roller 102 for uniformly charging the photosensitive surface is provided so as to be in contact with the photosensitive surface. The image forming apparatus 104 is configured in such a manner that the light beam 103 from the optical scanning unit 100 is radiated on the photosensitive surface charged by the charging roller 102.

As described above, the light beam 103 is modulated based on the image signal Di, and the light beam 103 is radiated to form an electrostatic latent image on the photosensitive surface. The electrostatic latent image is developed as a toner image by a developing unit 107 disposed to be in contact with the photosensitive surface on the downstream side of the irradiation position of the light beam 103 in the rotation direction of the photosensitive drum 101.

The toner image developed by the developing unit 107 is transferred onto a sheet 112 as a recording material by a transfer roller (transfer unit) 108 disposed at a position lower than the photosensitive drum 101 to face the photosensitive drum 101. Although the sheet 112 is stored in a sheet cassette 109 on the upstream side of the photosensitive drum 101 (right side in FIG. 5), it can be fed by manual feeding. A sheet feeding roller 110 is disposed at an end portion of the sheet cassette 109. The sheet feeding roller 110 feeds the sheet 112 in the sheet cassette 109 to the conveyance path.

The sheet 112 to which an unfixed toner image has been transferred is further conveyed to a fixing device disposed on the downstream side of the photosensitive drum 101 (left side in FIG. 5). The fixing device includes a fixing roller 113 having a fixing heater (not illustrated) therein, and a pressure roller 114 disposed to be in pressure contact with the fixing roller 113. This fixing device fixes the unfixed toner image on the sheet 112 by heating the sheet 112 conveyed from the transfer roller 108 while pressurizing the sheet 112 at the pressure contact portion between the fixing roller 113 and the pressure roller 114. Further, a discharge roller 116 is disposed on the downstream side of the fixing roller 113, and the sheet 112 on which the toner image is fixed is discharged outside the image forming apparatus 104.

The image forming apparatus 104 may be provided with a plurality of optical scanning units 100, a plurality of photosensitive drums 101, and a plurality of developing units 107 to configure a color image forming apparatus. Further, a color image reading apparatus including a line sensor such as a charge coupled device (CCD) sensor or a complementary metal oxide semiconductor (CMOS) sensor can be connected as the external device 117 to the image forming apparatus 104 to configure a color digital copying machine.

MODIFICATION

Although the exemplary embodiments of the present disclosure have been described above, the present disclosure is not limited to those exemplary embodiments, and various combinations, modifications, and alternations are possible within the scope of the embodiments disclosed.

For example, in each of the above-described exemplary embodiments, a configuration for scanning one surface to be scanned by a light beam from one light source is employed, but the configuration is not limited to this, and a configuration for deflecting light beams from a plurality of light sources simultaneously by one deflector to scan a plurality of surfaces to be scanned may be employed.

While the present has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-045414, filed Mar. 9, 2017, which is hereby incorporated by reference herein in its entirety.

What is claimed is:
1. An optical scanning apparatus comprising:
a deflector configured to deflect a light beam from a light source to cause the light beam to scan a surface to be scanned in a main scanning direction;
an incident optical system that includes a single incident optical element and is configured to guide the light beam from the light source to the deflector; and
an image-forming optical system configured to condense the light beam having been deflected by the deflector as condensing points on the surface to be scanned, wherein at least one of the incident optical system and the image-forming optical system includes a diffractive surface, and wherein the following expression is satisfied:

$$1.6 \leq |(s\Delta\lambda S - s\Delta\lambda M)/(s\Delta xS - s\Delta xM)| \leq 5.0$$

where $s\Delta\lambda M$ and $s\Delta\lambda S$ are displacement amounts of the condensing points formed by the image-forming optical system respectively in a main scanning section and a sub scanning section when a wavelength of the light beam from the light source varies by 10 nm, and $s\Delta xM$ and $s\Delta xS$ are displacement amounts of the condensing points respectively in the main scanning section and the sub scanning section when the light source or the incident optical element moves 100 μm in an optical axis direction.

2. The optical scanning apparatus according to claim 1, wherein the following expression is satisfied:

$$0.3 \leq (s\Delta\lambda S/s\Delta\lambda M)/(s\Delta xS/s\Delta xM) \leq 1.2.$$

3. The optical scanning apparatus according to claim 1, wherein in the image-forming optical system, an absolute value of a magnification in the sub scanning section is larger than an absolute value of a magnification in the main scanning section.

4. The optical scanning apparatus according to claim 1, wherein an absolute value of a magnification in the sub scanning section of the image-forming optical system is larger than four.

5. The optical scanning apparatus according to claim 1, wherein the image-forming optical system includes a single optical element arranged between the deflector and the surface to be scanned in the optical path of light beam.

6. The optical scanning apparatus according to claim 1, wherein the incident optical element has different powers in the main scanning section and the sub scanning section.

7. The optical scanning apparatus according to claim 6, wherein the incident optical element includes the diffractive surface.

8. The optical scanning apparatus according to claim 1, wherein scanning velocity of the light beam differs at an on-axis image height and an off-axis image height on the surface to be scanned.

9. An image forming apparatus comprising:
an optical scanning apparatus;
a developing unit configured to develop an electrostatic latent image formed on the surface to be scanned by the optical scanning apparatus as a toner image;
a transfer unit configured to transfer the developed toner image onto a recording material; and
a fixing device configured to fix the transferred toner image on the recording material,
wherein the optical scanning apparatus is comprised of:
a deflector configured to deflect a light beam from a light source to cause the light beam to scan a surface to be scanned in a main scanning direction;
an incident optical system that includes a single beam from the light source to the deflector; and
an image-forming optical system configured to condense the light beam having been deflected by the deflector as condensing points on the surface to be scanned,
wherein at least one of the incident optical system and the image-forming optical system includes a diffractive surface, and
wherein the following expression is satisfied:

$$1.6 \leq |(s\Delta\lambda S - s\Delta\lambda M)/(s\Delta xM - s\Delta xM)| \leq 5.0$$

where $s\Delta\lambda M$ and $s\Delta\lambda S$ are displacement amounts of the condensing points formed by the image-forming optical system respectively in a main scanning section and a sub scanning section when a wavelength of the light beam from the light source varies by 10 nm, and $s\Delta xM$ and $s\Delta xS$ are displacement amounts of the condensing points respectively in the main scanning section and the sub scanning section when the light source or the incident optical element moves 100 μm in an optical axis direction.

10. An image forming apparatus comprising:
an optical scanning apparatus; and
a printer controller configured to convert data output from an external device into an image signal and input the converted image signal to the optical scanning apparatus,
wherein the optical scanning apparatus is comprised of:
a deflector configured to deflect a light beam from a light source to cause the light beam to scan a surface to be scanned in a main scanning direction;
an incident optical system that includes a single incident optical element and is configured to guide the light beam from the light source to the deflector; and
an image-forming optical system configured to condense the light beam having been deflected by the deflector as condensing points on the surface to be scanned,
wherein at least one of the incident optical system and the image-forming optical system includes a diffractive surface, and
wherein the following expression is satisfied:

$$1.6 \leq |(s\Delta\lambda S - s\Delta\lambda M)/(s\Delta xS - s\Delta xM)| \leq 5.0$$

where $s\Delta\lambda M$ and $s\Delta\lambda S$ are displacement amounts of the condensing points formed by the image-forming optical system respectively in a main scanning section and a sub scanning section when a wavelength of the light beam from the light source varies by 10 nm, and $s\Delta xM$ and $s\Delta xS$ are displacement amounts of the condensing points respectively in the main scanning section and the sub scanning section when the light source or the incident optical element moves 100 μm in an optical axis direction.

* * * * *